United States Patent

[11] 3,608,039

| [72] | Inventors | Philip N. Ross, Jr.;<br>James B. Edwards, both of Cincinnati, Ohio |
|------|-----------|--------------------------------------------------------------------|
| [21] | Appl. No. | 767,855 |
| [22] | Filed     | Oct. 15, 1968 |
| [45] | Patented  | Sept. 21, 1971 |
| [73] | Assignee  | The Proctor & Gamble Company<br>Cincinnati, Ohio |

[54] PROCESS FOR THE HYDROGENATION OF AN OLEAGINOUS MATERIAL
8 Claims, No Drawings

| [52] | U.S. Cl.        | 204/167 |
|------|-----------------|---------|
| [51] | Int. Cl.        | B01k 1/00 |
| [50] | Field of Search | 204/167 |

[56] References Cited
UNITED STATES PATENTS

| 1,123,962 | 1/1915 | Walker     | 204/167 |
| 2,167,726 | 8/1939 | Richardson | 204/167 |

*Primary Examiner*—John H. Mack
*Assistant Examiner*—Neil A. Kaplan
*Attorney*—Richard C. Witte

ABSTRACT: A process for the catalytic hydrogenation of an unsaturated oleaginous material using a suspended particulate catalyst and an alternating current electric field to promote the hydrogenation is disclosed. A product of the process is useful as a salad oil.

PROCESS FOR THE HYDROGENATION OF AN OLEAGINOUS MATERIAL

BACKGROUND OF THE INVENTION

This invention relates to the hydrogenation of unsaturated oleaginous materials. In addition, this invention relates to an improved method of hydrogenating an oleaginous material at improved reaction rates by contacting an unsaturated oleaginous material with hydrogen in the presence of a suspended particulate catalyst and an alternating current electric field to effect the hydrogenation. More particularly, this invention relates to an improvement in the rate of hydrogenation through the use of an electric field to increase the efficacy of a suspended particulate catalyst in the hydrogenation of an unsaturated oleaginous material.

The hydrogenation of unsaturated oleaginous materials is old and well known in the art. The processes heretofore known for hydrogenation are normally effected by the use of a hydrogenation catalyst and hydrogen at a pressure with the process being run at an elevated temperature. The problems dealt with in the hydrogenation process art heretofore are the reduction in catalyst activity during the course of the hydrogenation or the increasing of catalyst activity in hydrogenation processes. Much appears in the art on methods and processes for not only increasing the catalyst activity in the hydrogenation of oleaginous materials but also in methods of reactivating the catalyst used in hydrogenation processes.

The modification of the catalyst activity in hydrogenating an oleaginous material through the use of electromagnetic fields or electric fields appears in the art. C. M. Paige in U.S. Pat. No. 1,472,281 discloses a method of hydrogenating an oleaginous material in the presence of a finely divided catalytic mass and hydrogen and regenerating the catalytic activity of the mass using an oscillating electromagnetic field. L. H. Ryerson in U.S. Pat. No. 2,107,505 discloses a process for hydrogenating animal fat involving the passing of an electrical current through electrodes containing a hydrogenation catalyst. I. Seto et al. in U.S. Pat. No. 2,147,177 discloses a method of hydrogenating fatty acid glycerides by subjecting the hydrogenation catalyst to a high tension alternating current discharge (arc) and a high tension direct current discharge (arc). O. F. Krumboltz in U.S. Pat. No. 2,352,791 discloses the use of an electromagnetic field to modify the activity of a hydrogenation catalyst in the hydrogenation of unsaturated materials. R. P. Dunmeyer in U.S. Pat. No. 2,729,689 discloses a method for hydrogenating unsaturated oleaginous materials by saturating the oleaginous materials with hydrogen and passing the mixture over surfaces of an electrically conductive hydrogenation catalyst with the simultaneous subjection of the surface of the catalyst to a high frequency electromagnetic field. S. Itakura in Japanese Pat. No. 1079/55 discloses a process for the hydrogenation of an oleaginous material in which an electromagnetic field is produced in the reaction vessel by passing a direct current through an iron or copper wire coil.

As can be seen from the art hereinbefore cited, the use of direct current electrical fields or electromagnetic fields to modify the activity, regenerate the activity, or to increase the activity of the hydrogenation catalyst in a hydrogenating process is old. The prior art deals with the use of catalytic electrodes and direct current to form an electromagnetic field or electrical field in the area in which the catalyst is present. The processes described above do not disclose the unexpected advantage which can be obtained in a hydrogenation process of an unsaturated oleaginous material in which the catalyst used to effect hydrogenation is an extremely finely divided particulate catalyst contained within the oleaginous material and a process in which the catalyst activity is dramatically and unexpectedly increased by inducing changes in the electrical characteristics of the hydrogenation catalyst suspended in an oleaginous material through the passage of a particular alternating electric current through electrodes in the oleaginous material/catalyst mixture. It was unexpected in view of the art cited hereinbefore that dramatic and unobvious increases in the rates of hydrogenation of oleaginous material could be obtained with the use of an alternating currant electric field and a suspended particulate catalyst.

Accordingly it is an object of this invention to provide a hydrogenation process whereby increased reaction rates can be obtained over those obtained in conventional hydrogenation processes. In addition it is an object of this invention to obtain the advantages of using a particulate catalyst suspended within the oleaginous material and an alternating electric current to obtain an increase in the rates of reaction in the hydrogenation process. In addition, it is an object of this invention to obtain good yields of saturated oleaginous materials at a faster rare than can be obtained in conventional processes, Moreover, it is an object of this invention to provide a process whereby unsaturated oleaginous material can be rendered more completely saturated thereby increasing their utility and value in the preparation of salad oils and other fat and oil materials.

SUMMARY OF THE INVENTION

This invention, in its broadest aspects, is an improvement in the process for the catalytic hydrogenation of an unsaturated oleaginous material in which the oleaginous material is contacted with hydrogen in the presence of a suspended particulate hydrogenation catalyst in a reaction zone at a temperature of from about 100° F. to about 450° F. and under a pressure of from about 14.7 p.s.i.a. i.e., about atmospheric, to about 200 p.s.i.a., the improvement comprising the creating of an alternating electric field in the reaction zone by applying an alternating electric current across a plurality of electrodes, said alternating electric current having a potential of from about 8,000 volts per centimeter to about 35,000 volts per centimeter and a frequency of about 25 cycles per second to about 100 cycles per second.

DESCRIPTION OF THE INVENTION

The process of this invention is the catalytic hydrogenation of an unsaturated oleaginous material. A particulate hydrogenation catalyst is suspended in the oleaginous material and the oleaginous material/catalyst slurry is subsequently contacted with hydrogen. The hydrogenation takes place normally in a reaction zone at an elevated temperature of from about 100° F. to about 450° F. and under a pressure of from about 14.7 p.s.i.a. to about 200 p.s.i.a. In the process of this invention a dramatic and unexpected improvement in the reaction rate can be obtained in the hydrogenation of an oleaginous material by applying an alternating electric current across a plurality of electrodes extending into the oleaginous material containing the suspended particulate catalyst. The unexpected improvement in rate which can be obtained over the use of no alternating electric field across the electrodes e.g., catalytic hydrogenation as practiced by Mills et al., in U.S. Pat. No. 2,520,423, and Mills in U.S. Pat. No. 2,520,425, can be obtained if the alternating electric current across the electrodes has a potential of from about 8,000 volts per centimeter to about 35,000 volts per centimeter and a frequency of from about 25 cycles per second to about 100 cycles per second.

OLEAGINOUS MATERIAL

The unsaturated oleaginous material which can be used in the catalytic hydrogenation process of this invention is any of the typical unsaturated fatty acid triglyceride oils. The process herein described is generally applicable to the treatment of those triglyceride oils which have iodine values between about 110 and about 140, such as cottonseed oil, peanut oil, sesame seed oil and soybean oil, to produce hydrogenated oils. These hydrogenated oils can be used alone in the manufacture of liquid salad oils or can be combined with other oleaginous materials in the manufacture of plastic shortenings. In addition suitable other triglycerides can be obtained from animal, vegetable, or marine sources, including naturally occurring triglyceride oils and fats such as olive oil, palm oil, coconut oil, corn oil, rapeseed oil, safflower oil, sunflower seed oil, sardine oil, lard, tallow and like materials containing unsaturated fatty acid groups having from about 12 to about 24 carbon atoms. In addition, the unsaturated straight chain fatty acids, of which the above oils contain major portions, such as palmitoleic acid, oleic acid, ricinoleic acid, linoleic acid, linolenic acid, eleostearic acid, arachidonic acid, and erucic acid, e.g., those having from about 12 carbon atoms to about 24 carbon atoms, are suitable. Soybean oil, cottonseed oil and peanut oil are preferred as the oleaginous materials since large quantities of these oils are available and are used commercially in the preparation of salad oils and shortenings. Sunflower seed oil and safflower oil are also preferred.

HYDROGENATION CATALYSTS

The suspended particulate catalyst, which can be employed in the process of this invention, are comprised principally of nickel. Where nickel is used, it can be used alone or promoted if desired with metals (or their oxides) such as copper, chromium, cobalt, zirconium, thorium or other known catalyst promoters. In addition catalysts of copper, chromium, cobalt, zirconium and thorium can be used alone. High activity catalysts made from noble metals such as platinum, silver, and palladium, can also be employed although their high costs make them commercially unattractive. Nickel and nickel with promoter metals or with promoter metal oxides as catalysts are preferred because of their ready availability.

The catalyst used in hydrogenation of oleaginous materials should have a large surface area because to effect hydrogenation it is necessary that hydrogen and the unsaturated material be contacted at a catalyst site. Thus a catalyst having an extremely small particle size is preferred because of the tremendous increase in surface area which can be obtained where the catalyst is finely ground. In the process of this invention a catalyst having an extremely small particle size is desired because of the increase in surface area obtained. Catalysts of a small particle size are also easily suspended, e.g., by admixing, in the oleaginous material to be hydrogenated. Suspending the catalyst in the oleaginous material provides more intimate contact of the oleaginous material and the catalyst thus increasing the chances of the hydrogen and unsaturated oleaginous material being contacted at a catalyst site. The above-mentioned catalysts are normally commercially available and can be obtained from commercial sources in the particle size desired. The particle size of the catalyst for use in the process of this invention will normally be from about 1 micron to about 200 microns in diameter, preferably from about 5 microns to about 10 microns. These particle sizes facilitate the suspension of the catalyst in the oleaginous material and provide the surface area necessary to effect hydrogenation. The catalyst suspended in the oleaginous material will normally be present at a level of from about 0.01 percent to about 1 percent by weight (on a catalyst metal or active weight basis) to the oleaginous material present, preferably from about 0.02 percent to about 0.2 percent.

PROCESS CONDITIONS

The temperature of operation of the process of this invention will be from about 100° F. to about 450° F., preferably from about 250° F. to about 400° F. With temperatures below 100° F. the rate of hydrogenation is very slow and with temperatures above 450° F. degradation of the oleaginous material can occur.

The pressure of operation within the reaction vessel in the process of this invention will normally be at about atmospheric pressure, e.g., 14.7 p.s.i.a., or above. The hydrogenation of the oleaginous material can be accomplished at superatmospheric pressures up to about 200 p.s.i.a. It is preferred that the pressure within the system be from about atmospheric pressure to about 100 p.s.i.a., more preferably from about atmospheric pressure to about 50 p.s.i.a. Pressures above about atmospheric pressure are desirable to increase the solubility of hydrogen in the oleaginous material and to facilitate the increase in reaction rates obtainable with the process of this invention.

Agitation of the oleaginous material/suspended particulate catalyst mixture is desirable in the operation of the process of this invention to insure intimate contact of the hydrogen, the oleaginous material and the catalyst. In addition the agitation ensures that the particulate catalyst particles remain uniformly suspended in the oleaginous material. The type of agitation which can be efficiently employed in the process of this invention is described in the Mills et al. and Mills patents, supra. The agitation can be provided by any means. On a small scale, a turbine impeller operating at from about 100 r.p.m. to about 2,000 r.p.m., preferably from about 500 r.p.m. to about 1,000 r.p.m., is suitable. Where large amounts of oleaginous material are to be hydrogenated one skilled in the art can make appropriate adjustments in the agitation necessary. Agitation is necessary to ensure the intimate gas/liquid/solid interface desirable in hydrogenating an unsaturated material.

The reaction zone is the term used herein to described the area in which the oleaginous material/catalyst slurry is contacted with hydrogen and the electric field. Any type of reaction vessel, reaction container, reaction tube, apparatus, and the like can be used in the process as the reaction zone. The process can either be run as a batch process or a continuous process.

The alternating current electric field is generated in the reaction zone by applying an alternating current electric potential across a plurality of electrodes. The electrodes through which the alternating current electric potential is applied in the reaction zone are connected in pairs and extend into the reaction mass, i.e., the oleaginous material/catalyst slurry. The number of pairs of electrodes to be used will depend on the size and design of the reaction zone. Normally from about 2 to about 50, preferably from about 6 to about 30 electrodes are used. Where small amounts of oleaginous material are to be hydrogenated the electrodes will generally be flat sheets having from about 0.5 to about 20, preferably from about 2 to about 10, square inches of surface area. In the hydrogenation of larger amounts of oleaginous material the size and the number of pairs of electrodes can be modified accordingly. The shape, size, and number of pairs of electrodes used in the process of this invention are not critical considerations as long as a suitable voltage gradient, described hereinafter, can be obtained in the reaction zone. Materials which are exemplary and not limiting from which the electrodes can be made are nickel, palladium, silver, and platinum. Any conductor of an electric current, however, can be used. One skilled in the art can design suitable equipment to accomplish the above without departing from the spirit and scope of this invention.

The electric field is generated in the reaction zone by the application of voltage to the electrodes described above creating a voltage gradient in the reaction zone. As described previously the number of pairs, size, and shape of the electrodes are not critical. In order to obtain the advantages of the process of this invention the voltage necessary to generate the alternating current electric field in the reaction zone is a voltage gradient between the electrodes of from about 8,000 to about 35,000 volts per centimeter of electrode separation. It is preferred that the voltage gradient be from about 15,000 volts per centimeter to about 25,000 volts per centimeter of electrode separation. A voltage gradient higher than about 35,000 volts per centimeter necessitates the use of extremely high voltage equipment and does not result in any added advantages in hydrogenation rate while the unexpected increase in hydrogenation rate with the process of this invention is not obtained with voltage gradients lower than about 8,000 volts per centimeter.

Any alternating electric current source such as a generator or even line voltage can be used to generate the necessary voltage gradient. In the hydrogenation process of this invention the alternating current field by which the polarity of electrodes is changed periodically, depending on the frequency of the alternating current used, is related to obtaining the advantages of the process of this invention. In order to achieve the increase in reaction rates obtainable with the process of this invention, the frequency of the alternating current used is from about 25 to about 100, preferably from about 40 to about 80 cycles per second. An alternating current frequency lower than 25 cycles per second is not sufficient to enhance the catalyst activity to obtain objects of this invention. With an alternating current field frequency greater than 100 cycles per second the rate of hydrogenation is considerably less than that obtained with lower frequencies. The preferred frequency range is especially advantageous because this range encompasses the alternating current frequencies which can be obtained from commercial power sources (e.g., 50 c.p.s. or 60 c.p.s.).

The degree of reaction, or amount of hydrogenation, can be determined by typical chemical analyses, e.g., using the iodine value or the refractive index, on samples of the oleaginous material withdrawn from the reaction zone. For example, obtaining an iodine value lower than about 90 to 100 is considered sufficient hydrogenation in the preparation of salad oils. As with typical heretofore-known hydrogenation processes the degree of hydrogenation can be controlled where desired by regulating the introduction and removal of the oleaginous material/catalyst slurry into the reaction zone. To obtain efficient hydrogenation at the rates obtainable with the process of this invention the amount of hydrogen supplied into the reaction zone should, of course, be adequate for the degree of hydrogenation desired. Normally the amount of hydrogen is somewhat in excess of the stoichiometric amount necessary in order to ensure efficient hydrogenation in the reaction zone. Good yields of about 90 to 100 percent at from about a 20 percent to about a 50 percent increase in rate can be obtained. With a batch process the time required is 2 hours or less and with a continuous process the time required is less than 10 minutes.

Example

The reaction zone consisted of a 2,000 ml. glass reaction kettle. The reaction kettle contained an electrode plate assembly of 16 nickel electrodes (8 pairs each connected alternately to the alternating electric current source). In the electrode plate assembly, the electrodes were stacked 2 millimeters apart. The area of each electrode was 9 square inches. The electrode pairs were connected to a high-voltage AC current source. The AC current source could be varied in frequency and was generated by an audio-oscillator, a power amplifier and a gaseous tube transformer. The voltage applied to the electrodes to generate the voltage gradient was monitored with an oscilloscope connected across the primary to the transformer.

A particulate nickel catalyst promoted with zirconium having an average particle size of about 5 microns was mixed with 750 ml. of soybean oil (0.04 percent by weight of catalyst to oil). The oil/catalyst slurry was placed in the 2,000 ml. reaction kettle. The volume of the oil/catalyst slurry was sufficient to cover the electrode plate assembly. A turbine mixer (600 r.p.m.) was inserted into the oil/catalyst slurry to provide the necessary agitation. Hydrogen was charged into the reaction kettle with the soybean oil/catalyst slurry at 14.72 p.s.i.a. The reaction time was 2 hours at 280° F. This temperature was obtained using a heating mantle, controlled with a Variac, surrounding the reaction kettle.

The above procedure was used to establish the rate of hydrogenation of the soybean oil in the absence of an alternating current electrical field. The samples obtained from the reaction zone were analyzed using gas chromatographic fatty acid composition analyses, I.V. (iodine value), and refractive index. The procedure used above for establishing the control hydrogenation rate (e.g. without an electric field) was repeated three times with an alternating current electric field of 25 c.p.s., 40 c.p.s., and 80 c.p.s., respectively, at 22,000 volts per centimeter being applied across the electrodes.

Table I below shows the results obtained at varying points in time for the hydrogenation of soybean oil with a nickel-zirconium catalyst in the absence of an electric field and with the three alternating current frequencies described above being applied.

Table I

Effect of AC Field Frequency on Hydrogenation Rate

| | (Iodine Value) | | | |
|---|---|---|---|---|
| Time (min.) | Control | 25 c.p.s. | 40 c.p.s. | 80 c.p.s. |
| 0 | 133 | 132 | 132 | 132 |
| 20 | 124 | 126 | 124 | 124 |
| 40 | 118 | 119 | 116 | 118 |
| 60 | 110 | 111 | 107 | 107 |
| 80 | 103 | 102 | 98 | 97 |
| 100 | 98 | 94 | 89 | 87 |
| 120 | 94 | 86 | 80 | 77 |

The above results demonstrate the increase in rate which can be obtained through the application of an alternating current electric field to the reaction zone in hydrogenation of soybean oil. Even as small a frequency as 25 c.p.s. results in an increase in the hydrogenation rate as measured by the iodine value (The iodine value is a measure of the degree of unsaturation of the oil and the lower the iodine values the greater the degree of saturation of the oil.) over that obtainable without the application of the AC electric field (control). An even greater increase in the hydrogenation rate is obtained with increased frequencies, e.g., 40 c.p.s. and 80 c.p.s.

Substantially similar results are obtained when in the above example other unsaturated oils are substituted on an equivalent basis for soybean oil in that the unsaturated oils are hydrogenated, as for example, cottonseed oil, peanut oil, sesameseed oil, olive oil, palm oil, coconut oil, corn oil, rapeseed oil, safflower oil, sunflower seed oil, sardine oil, lard and tallow.

Substantially similar results are obtained when in the above example other catalysts are substituted on an equivalent basis for the nickel-zirconium catalyst in that soybean oil is hydrogenated, e.g., nickel, platinum, palladium, chromium, cobalt, zirconium, thorium, copper and nickel promoted by the following metals, or their oxides, e.g., copper, chromium cobalt, zirconium, and thorium. Substantially similar results are also obtained when in the above example catalysts having average particle sizes of from about one to about 200 microns in diameter are used. Substantially similar results are also obtained in the above example when the suspended catalyst is present in the soybean oil at a level from about 0.01 percent to about 1 percent by weight (on a catalyst metal or active weight basis).

Substantially similar results are obtained when in the above example other alternating current frequencies are used in that soybean oil is hydrogenated, e.g., frequencies from about 25 c.p.s. to about 100 c.p.s. and when other voltage gradients are used, e.g., from about 8,000 volts per centimeter to about 35,000 volts per centimeter.

Substantially similar results are obtained when in the above example electrodes of other compositions are substituted for the nickel electrodes used above in that soybean oil is hydrogenated, e.g., palladium, silver and platinum.

The oleaginous materials produced by the above example are useful. For example it can be seen that saturated oleaginous materials having an iodine value of from about 90 to about 100, useful in the preparation of salad oils and shortenings, can be obtained in 90 to 100 percent yield in less than 2 hours using an alternating frequency of 25 c.p.s. and in just over 1 hour using alternating current frequencies of 40 or 80 c.p.s.

What is claimed is:

1. In the catalytic hydrogenation of an unsaturated oleaginous material wherein the oleaginous material is contacted with hydrogen in the presence of a suspended particulate hydrogenation catalyst in a reaction zone at a temperature of from about 100° F. to about 450° F. and at a pressure of from about 14.7 p.s.i.a. to about 200 p.s.i.a., the improvement which comprises creating an alternating electric field in said reaction zone by applying an alternating electric current across a plurality of electrodes, said alternating electric current having a potential of from about 8,000 volts per centimeter to about 35,000 volts per centimeter and a frequency of from about 25 cycles per second to about 100 cycles per second.

2. The process of claim 1 wherein the oleaginous material is selected from the group consisting of cottonseed oil, peanut oil, sesame seed oil, olive oil, palm oil, coconut oil, corn oil, sunflower seed oil, soybean oil, rapeseed oil, safflower oil, lard and tallow.

3. The process of claim 1 wherein the catalyst is selected from the group consisting of nickel, platinum and palladium, and nickel promoted with a metal, or its oxide, said metal being selected from the group consisting of copper, chromium, cobalt, and zirconium.

4. The process of claim 2 wherein the oleaginous material is selected from the group consisting of soybean oil, cottonseed oil, peanut oil, sunflower seed oil, and safflower oil.

5. The process of claim 3 wherein the catalyst is selected from the group consisting of nickel and nickel promoted with a metal, or its oxide, said metal being selected from the group consisting of copper, chromium, cobalt, zirconium and thorium.

6. The process of claim 1 wherein the temperature is from about 250° to about 400°.

7. The process of claim 1 wherein the potential is from about 15,000 volts per centimeter to about 25,000 volts per centimeter.

8. The process of claim 1 wherein the frequency is from about 40 cycles per second to about 80 cycles per second.